United States Patent
Li et al.

(10) Patent No.: US 10,382,144 B2
(45) Date of Patent: Aug. 13, 2019

(54) SYSTEMS, METHODS, AND DEVICES FOR INTERFERENCE MITIGATION IN WIRELESS NETWORKS

(71) Applicant: INTEL CORPORATION, Santa Clara, CA (US)

(72) Inventors: Qinghua Li, San Ramon, CA (US); Xiaogang Chen, Portland, OR (US); Yuan Zhu, Beijing (CN); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/485,789

(22) Filed: Apr. 12, 2017

(65) Prior Publication Data
US 2017/0338899 A1 Nov. 23, 2017

Related U.S. Application Data

(63) Continuation of application No. 14/858,975, filed on Sep. 18, 2015, now Pat. No. 9,660,736.
(Continued)

(51) Int. Cl.
*H04B 7/0452* (2017.01)
*H04B 15/00* (2006.01)
(Continued)

(52) U.S. Cl.
CPC ........... *H04B 15/00* (2013.01); *H04B 7/0452* (2013.01); *H04L 5/0023* (2013.01);
(Continued)

(58) Field of Classification Search
CPC .... H04B 7/0684; H04B 1/7075; H04B 15/00; H04L 5/0048; H04L 27/2602; H04L 5/0023
(Continued)

(56) References Cited

U.S. PATENT DOCUMENTS

| 7,813,421 B2 | 10/2010 | Sarrigeorgidis |
| 8,340,169 B1 | 12/2012 | Sarrigeorgidis |

(Continued)

FOREIGN PATENT DOCUMENTS

WO  2014/044651 A1  3/2014

OTHER PUBLICATIONS

International Search Report and Written Opinion received in PCT Application No. PCT/US2015/057165, dated Feb. 17, 2016, 14 pages.

*Primary Examiner* — Emmanuel Bayard
(74) *Attorney, Agent, or Firm* — Eversheds Sutherland (US) LLP

(57) ABSTRACT

Example systems, methods, and devices for mitigating interference in wireless networks are discussed. One example method includes the operations of passing channel frequency offsets of a plurality of LTF symbols on a plurality of subcarriers through a high pass frequency band, encoding the plurality of LTF symbols with a plurality of LTF sequences across frequency, and encoding the LTF symbols in time and/or frequency. Another example includes the operations of receiving a plurality of LTF symbols on a plurality of subcarriers for channel estimation of one or more streams, removing the encoding across time, removing the encoding across frequency, and removing the LTF sequence(s), and passing the modified LTF symbols through a smoothing filter, for example, a low pass filter for removing the interference due to CFOs. Methods, apparatus, and systems described herein can be applied to 802.11ax or any other wireless standard.

20 Claims, 11 Drawing Sheets

Related U.S. Application Data

(60) Provisional application No. 62/081,996, filed on Nov. 19, 2014.

(51) Int. Cl.
   *H04L 5/00* (2006.01)
   *H04L 27/26* (2006.01)

(52) U.S. Cl.
   CPC ........ *H04L 5/0048* (2013.01); *H04L 27/2613* (2013.01); *H04L 27/2657* (2013.01); *H04L 27/2695* (2013.01)

(58) Field of Classification Search
   USPC .................................. 375/229, 232, 260
   See application file for complete search history.

(56) References Cited

U.S. PATENT DOCUMENTS

| | | | |
|---|---|---|---|
| 8,379,763 B2 | 2/2013 | Sawai | |
| 8,437,440 B1* | 5/2013 | Zhang | H04L 1/0625 |
| | | | 375/366 |
| 8,699,556 B1 | 4/2014 | Sarrigeorgidis | |
| 8,867,462 B2 | 10/2014 | Lee et al. | |
| 9,001,873 B2 | 4/2015 | Sarrigeorgidis | |
| 9,001,930 B2 | 4/2015 | Suh et al. | |
| 9,048,936 B2 | 6/2015 | Vermani et al. | |
| 9,306,789 B2 | 4/2016 | Dhayni | |
| 9,319,896 B2 | 4/2016 | Liu et al. | |
| 9,398,570 B2 | 7/2016 | Lee et al. | |
| 9,660,736 B2* | 5/2017 | Li | H04L 27/2613 |
| 2007/0230431 A1* | 10/2007 | Driesen | H04B 7/0669 |
| | | | 370/345 |
| 2010/0290449 A1 | 11/2010 | Van Nee et al. | |
| 2011/0194655 A1 | 8/2011 | Sampath et al. | |
| 2012/0189085 A1 | 7/2012 | Shi | |
| 2013/0114757 A1 | 5/2013 | Park et al. | |
| 2013/0272147 A1* | 10/2013 | Vermani | H04B 7/0891 |
| | | | 370/252 |
| 2013/0301551 A1 | 11/2013 | Ghosh et al. | |
| 2014/0029685 A1 | 1/2014 | Van Nee et al. | |
| 2014/0226703 A1* | 8/2014 | Sarrigeorgidis | H04L 25/0224 |
| | | | 375/219 |
| 2014/0301412 A1 | 10/2014 | Kim et al. | |
| 2014/0307612 A1* | 10/2014 | Vermani | H04L 5/0044 |
| | | | 370/312 |
| 2014/0307650 A1* | 10/2014 | Vermani | H04L 5/0044 |
| | | | 370/329 |
| 2015/0023335 A1 | 1/2015 | Vermani et al. | |
| 2015/0110231 A1* | 4/2015 | Alexander | H04L 27/2657 |
| | | | 375/362 |
| 2015/0189639 A1 | 7/2015 | Zhang | |
| 2015/0236831 A1* | 8/2015 | Kang | H04L 5/0048 |
| | | | 370/338 |
| 2015/0257133 A1 | 9/2015 | Kim et al. | |
| 2016/0066321 A1 | 3/2016 | Yu | |
| 2016/0119047 A1 | 4/2016 | Lee | |
| 2016/0119171 A1* | 4/2016 | Suh et al. | |
| 2016/0142158 A1 | 5/2016 | Li et al. | |
| 2016/0142227 A1 | 5/2016 | Li et al. | |
| 2016/0143026 A1 | 5/2016 | Seok | |
| 2016/0191136 A1 | 6/2016 | Liu et al. | |
| 2016/0255178 A1* | 9/2016 | Kim | H04L 1/0072 |
| | | | 370/329 |

* cited by examiner

SYSTEMS, METHODS, AND DEVICES FOR INTERFERENCE MITIGATION IN WIRELESS NETWORKS

CROSS-REFERENCE TO RELATED APPLICATIONS

This application is a continuation of U.S. patent application Ser. No. 14/858,975, filed Sep. 18, 2015, which claims priority to U.S. Provisional Patent Application No. 62/081,996 filed on Nov. 19, 2014, the entire contents of which are incorporated herein by reference.

TECHNICAL FIELD

Embodiments described herein generally relate to wireless networks and, more particularly, to mitigating interference in a wireless network.

BACKGROUND

Wi-Fi network performance is an important factor in environments with high numbers of users, such as hotspots in public venues. Efficient use of available spectrum and better management of interferences in a Wi-Fi environment may improve Wi-Fi performance. In order to address the issue of increasing bandwidth requirements that are demanded for wireless communications systems, different schemes may be employed to allow multiple user devices to communicate with a single access point by sharing the channel resources while achieving high data throughputs. Multiple Input or Multiple Output (MIMO) technology represents one such scheme that has emerged for wireless communication systems. MIMO technology has been adopted in several emerging wireless communications standards such as the Institute of Electrical and Electronics Engineers (IEEE) 802.11 standard.

In addition, a next generation wireless local area network (WLAN), IEEE 802.11ax or High-Efficiency WLAN (HEW), is under development. Uplink multiuser multiple-input multiple-output (UL MU-MIMO) and Orthogonal Frequency-Division Multiple Access (OFDMA) are two features included in that standard. However, modulation and coding schemes (MCS) 7-9 cannot be reliably supported in UL MU-MIMO using existing systems and methods.

DETAILED DESCRIPTION

Example embodiments described herein provide systems, methods, and devices, for mitigating interference in various Wi-Fi networks, including but not limited to IEEE 802.11ax.

The terms "communication station", "station", "handheld device", "mobile device", "wireless device" and "user equipment" (UE), as used herein, refer to a wireless communication device such as a cellular telephone, smartphone, tablet, netbook, wireless terminal, laptop computer, a wearable computer device, a femtocell, High Data Rate (HDR) subscriber station, access point, access terminal, or other personal communication system (PCS) device. The device may be either mobile or stationary.

The term "access point" (AP) as used herein may be a fixed station. An access point may also be referred to as an access node, a base station or some other similar terminology known in the art. An access terminal may also be called a mobile station, a user equipment (UE), a wireless communication device or some other similar terminology known in the art. Embodiments disclosed herein generally pertain to wireless networks. Some embodiments c a n relate to wireless networks that operate in accordance with one of the IEEE 802.11 standards including but not limited to the IEEE 802.11ax standard.

Figure 1:
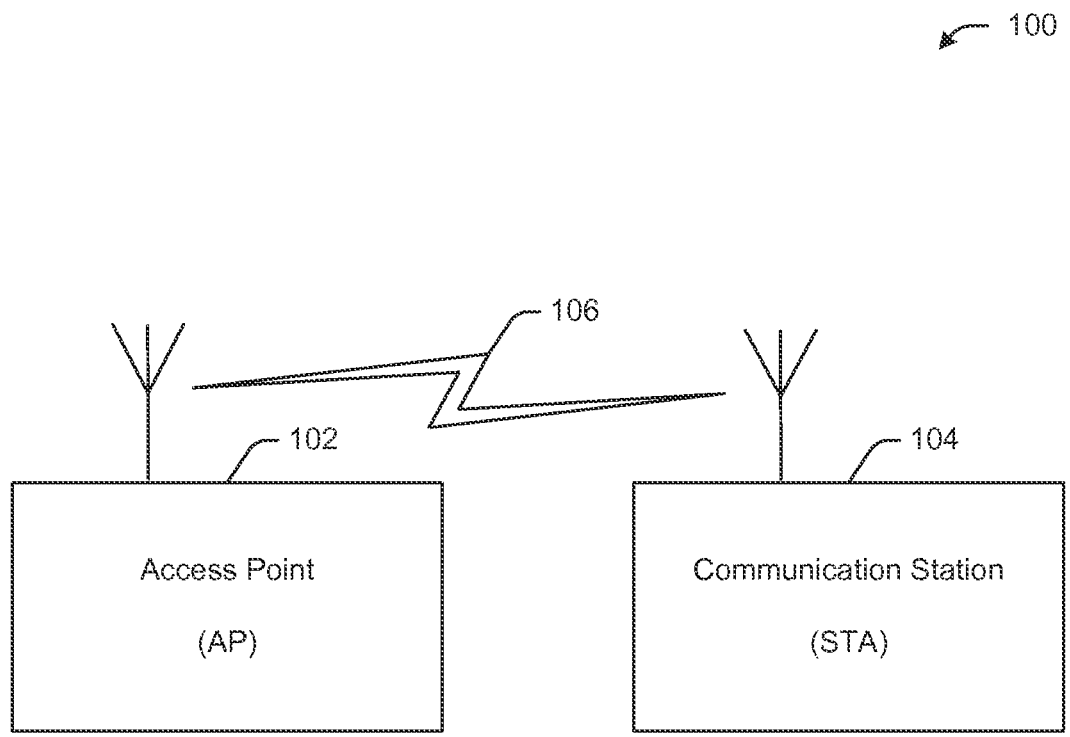
FIG. 1 is a network diagram illustrating an example wireless network environment, according to one or more example embodiments.

FIG. 1 is a network diagram illustrating an example wireless network environment, according to some example embodiments. Wireless network 100 can include one or more communication stations (STAs) 104 and one or more access points (APs) 102, which may be connected via a wireless link 106 and may communicate in accordance with any wireless communication standard, including but not limited to the IEEE 802.11ax standard. The communication stations 104 may be mobile devices that may be non-stationary, and the APs 102 may be stationary and have fixed locations.

In accordance with some IEEE 802.11ax (High-Efficiency WLAN (HEW)) embodiments, an access point may operate as a master station which may be arranged to contend for a wireless medium (e.g., during a contention period) to receive exclusive control of the medium for an HEW control period (i.e., a transmission opportunity (TXOP)). The master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique also called multiuser multiple-input multiple-output (MU-MIMO).

The master station may also communicate with legacy stations in accordance with legacy IEEE 802.11 communication techniques. In some embodiments, the master station may also be configurable communicate with HEW stations outside the HEW control period in accordance with legacy IEEE 802.11 communication techniques, although this is not a requirement.

In other embodiments, the links of an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In certain embodiments, a 320 MHz contiguous bandwidth may be used. In other embodiments, bandwidths of 5 MHz and/or 10 MHz may also be used. In these embodiments, each link of an HEW frame may be configured for transmitting a number of spatial streams.

Figure 2:
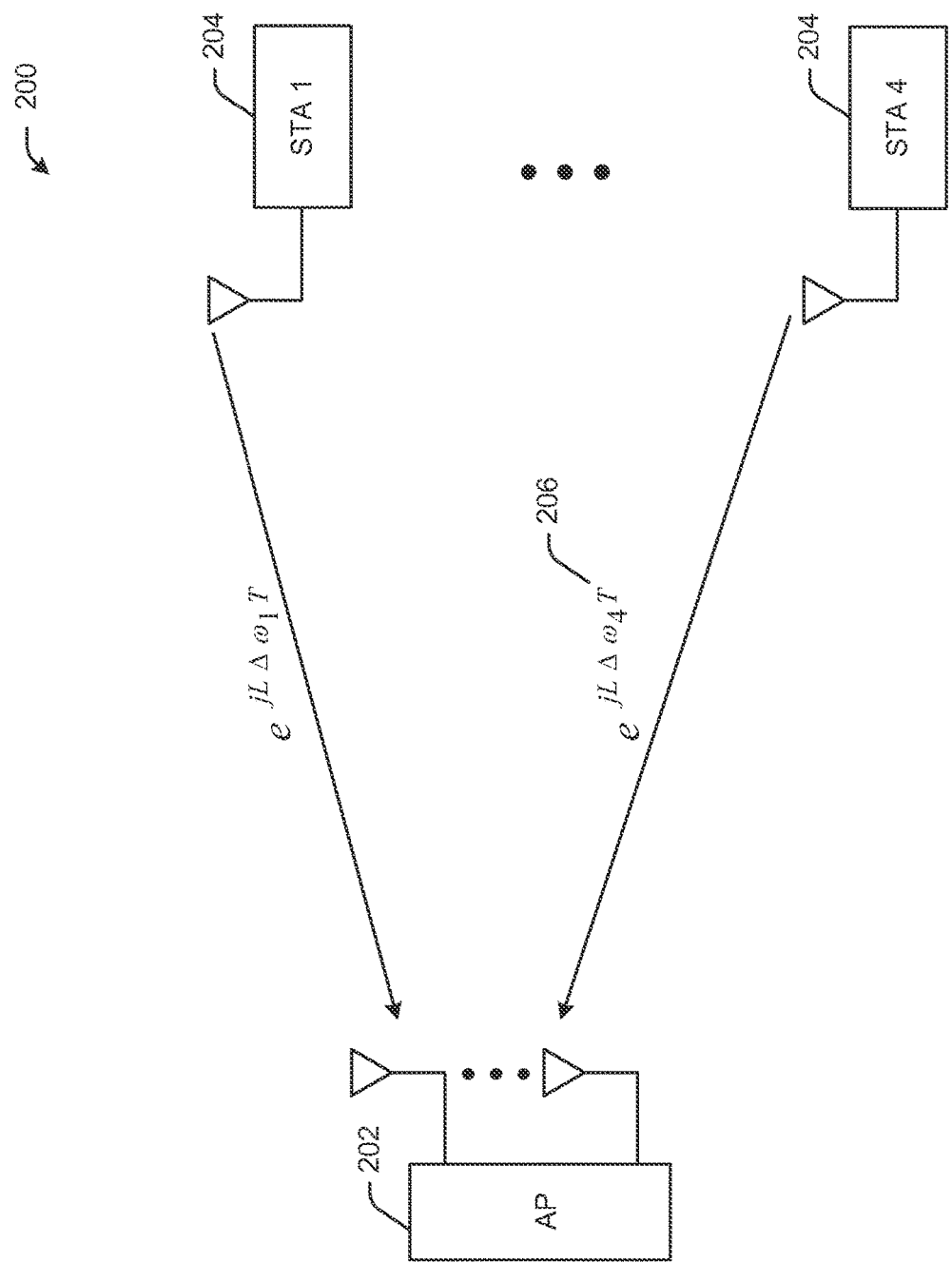
FIG. 2 illustrates an example wireless network environment including UL MU-MIMO with channel frequency offsets from a plurality of users, according to one or more example embodiments.

A feature of DensiFi (e.g., a possible next generation wireless local area network (WLAN), IEEE 802.11ax or High-Efficiency WLAN (HEW)) is a channel training signal design for uplink multiuser MIMO (UL MU-MIMO). While one aspect reuses the P-matrix structure in 802.11n/ac, and other aspect uses a new tone-interleaved structure. A drawback of the P-matrix structure, however, is that the P-matrix may be vulnerable to channel frequency offsets (CFOs) in a multiuser MIMO (MU-MIMO) as illustrated in FIG. 2, for example. Access point (AP) 202 may communicate with a plurality of communication stations (STAs) 204 in an example Wi-Fi network 200, according to one or more example embodiments. P-matrix decoding assumes little or no CFOs across long training field (LTF) symbols over time and relies on the orthogonal codes defined in the P-matrix to remove the potential interferences from the other spatial streams. However, the CFOs in uplink MU-MIMO are not negligible for high modulation orders, and different users may have different CFOs. Accordingly, the access point (AP) receiver has to estimate the CFO of each user in the presence of interference from other users. This could be challenging in some instances. CFOs from different users can destroy the orthogonality of the P-matrix and cause interferences with each other. Modulation and coding schemes (MCS) 7-9 cannot be reliably supported in uplink MU-MIMO using the existing systems and methodologies.

The systems, methods, and devices described in the present disclosure provide an enhancement to the P-matrix structure such that CFO of each user can be estimated and the interference due to other users' CFOs can be mitigated. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Details of one or more implementations are set forth in the accompanying drawings and in the description below. Further embodiments, features, and aspects will become apparent from the description, the drawings, and the claims. Embodiments set forth in the claims encompass all available equivalents of those claims.

Referring now to FIG. 2, a plurality of streams (e.g., signals) are illustrated, each having a different channel frequency offset. Streams typically comprise a sequence of one or more LTF symbols 206 and which are received by a receiver, such as access point(s) 202, from different channels (and/or subbands of channels) associated with different users and/or stations 204 (e.g., user devices or other devices such as a content-providing platform, a control system, a network distribution engine, wireless stations, and/or the like) in an uplink MU-MIMO. LTF symbols are then encoded into one or more streams (e.g., channel responses, signals at a particular channel frequency, an audio signal, a video signal, a data signal, and/or the like) by different users using P-matrix codes in an uplink (e.g., upon transmittal of a stream from a user device to an access point, for example).

In some embodiments, different LTF sequences and/or different P-matrices may be constructed and used for encoding and/or decoding different streams in uplink. FIG. 2 depicts an uplink process between a plurality of stations 204 (e.g., STA, user devices, and/or the like) and an access point 202. In other instances, a P-matrix-encoded LTF may be reused for uplink for different streams with various devices. In this way, the same P-matrix may be used for both encoding and decoding different streams with sequences of LTF symbols. Encoding and/or decoding can occur during uplink or downlink transmissions at an access point 202 and/or a station 204 (or other device). However, in such instances, a P-matrix-encoded LTF in an uplink MU-MIMO may have the same or different channel frequency offsets (CFOs) for each stream of channels and/or subbands of channels associated with different users and/or devices, as shown in FIG. 2.

As such, it may be difficult to estimate a CFO of each user and/or user stations 204 to accurately identify a channel frequency of each channel due to interferences from various devices communicating on the same channels and/or subbands of channels. For example, having different CFOs on the same channel may introduce unwanted interferences among the uplink MU-MIMO streams and creates issues during processing (e.g., encoding and/or decoding) of streams. Furthermore, because the CFOs of the uplink devices may be calculated by via measuring (e.g., determining) a phase change across time of each device's signals transmitting streams of LTF symbol sequences, any introduced interference may skew estimations of CFOs. Therefore, in uplink MU-MIMO, CFO correction processes may be unable to utilize LTFs and may be delayed until pilots (e.g., known training signals on known subcarriers for channel frequency tracking or channel variation tracking, and/or the like) in data transmissions are received.

For ease of receiver implementation at the access point 202, LTF symbol sequences of some or all streams are terminated at the same time in the uplink by stations 204 and in the downlink by the access point 202. By terminating some or all streams of a channel and/or subbands of a channel at the same time in the uplink or in the downlink, the access point 202 assigns the same number of LTF symbols to each stream. In this manner, the number of LTF symbols for each channel and/or each subband of a channel is determined by the channel and/or subband of a channel with the maximum number of streams. The access point 202 (and/or a processing device of the access point 202) is configured to determine a number of streams in each channel and/or subband of a channel. The P-matrix sizes may be 2×2, 4×4, 6×6, or 8×8, however, the number of LTF symbols is rounded to the least P-matrix size e.g. 2, 4, 6, or 8 that is greater than or equal to the maximum number of streams. Therefore, each channel and/or subband of a channel will have the same number of LTF symbols in its LTF sequence used for encoding and/or decoding P-matrices.

For the channels and/or subbands of a channel determined to have a number streams less than the maximum number of streams, extra LTF symbols (e.g, additional LTF symbols that aren't required for transmitting signals (e.g., streams) on the channels and/or subbands of a channel determined to have a number streams less than the maximum number of streams) can be added to the LTF symbols in the LTF symbol sequence that is required for transmitting signals (e.g., streams) on each channel and/or subband of a channel. For example, the first few rows of a larger P-matrix as in 802.11n/ac may be utilized to replace a smaller P-matrix that is required when transmitting signals on each channel determined to have a number streams less than the maximum number of streams. However, this method may not allow the receiver to decode the channel response using part of LTF symbols.

For CFO estimation (e.g., determination) as described herein, the receiver (e.g., a device, a user device, a station 204, and/or the like) can observe channel responses (e.g., signals and/or streams including LTF symbol sequences) separated in time such that a difference in phase can be detected and then used for CFO estimation of the channel. Instead of using the first few rows (or columns) of a larger P-matrix for encoding and/or decoding of LTF symbols into a stream, a P-matrix as small as possible may be selected such that the receiver (e.g., an access point 202 and/or a user device or station 204) can decode the channel response with the smallest number of LTF symbols. For example, if the number of required LTF symbols for the whole channel is four and a subband of a channel has two streams, then a selected P-matrix used for encoding and/or decoding may be a 2×2 P-matrix instead of a legacy 4×4 P-matrix. Typically, a P-matrix is a square orthogonal matrix, wherein all rows of the P-matrix are orthogonal with each other, and all columns are also orthogonal with each other. However, while a P-matrix may be desirable, any orthogonal matrix can be used in place of a P-matrix.

In addition and as discussed above, additional LTF symbols may be padded (e.g., added into one or more columns of a selected P-matrix) because a code length of a transmission is shorter than a number of LTF symbols required for transmitting a stream. The code length of a transmission may be determined by the access point 202 and may correspond to a number of LTF symbols required for transmission of a stream. For example, a subband of a channel that includes four streams may require four LTF symbols for transmission, whereas a second subband of the same channel may include only two streams and therefore may require only two LTF symbols for transmission. In this manner, the access point 202 determines that the second subband has a shorter code length than the first subband based on a comparison of a number of required LTF symbols for each subband. The access point 202 then may determine that two additional LTF symbols are to be padded into the second subband transmission so that the number of LTF symbols of the first and second subbands (and potentially all other subbands in the same channel) are the same. The access point 202 may further determine a P-matrix size required for transmission using a channel and/or subband of a channel based on a required number of LTF symbols. As an alternative for this example, the access point 202 may determine that 4×4 P-matrix may be used. The first subband uses all four rows of the 4×4 P-matrix for the four streams, respectively; and the second subband uses only the first two rows for the same 4×4 P-matrix for the two streams, respectively.

In some embodiments, a sequence of LTF symbols may be utilized for encoding and/or decoding a transmission, such as a channel response. Sequences of LTF symbols may be included at the beginning and/or the end of a transmission in a preamble or data header. Alternatively, sequences of LTF symbols may be embedded into a transmission data signal using digital watermarking and/or other encoding techniques common in the art. Typically, LTF symbols are encoded into a transmission data signal using a P-matrix. Again, using the smallest P-matrix possible based on a determined number of streams in a channel and/or subband of a channel, additional LTF symbols are padded such that a channel response (e.g., a stream, a transmission of data, content, and/or the like) can be encoded and/or decoded with the fewest LTF symbols at the end and/or beginning of a LTF symbol sequence. Finally, for maximizing time separation between channel observations (e.g., receipt of channel responses), a number of P-matrix columns is determined and selected by the access point 202 such that the beginning and/or the end of an LTF symbol sequence has a complete set of LTF symbols sufficient to encode and/or decode the channel response after its transmission. In this manner, the access point 202 and stations 204 are enabled to communicate with one another using a common sequence of LTF symbols.

Figure 3:
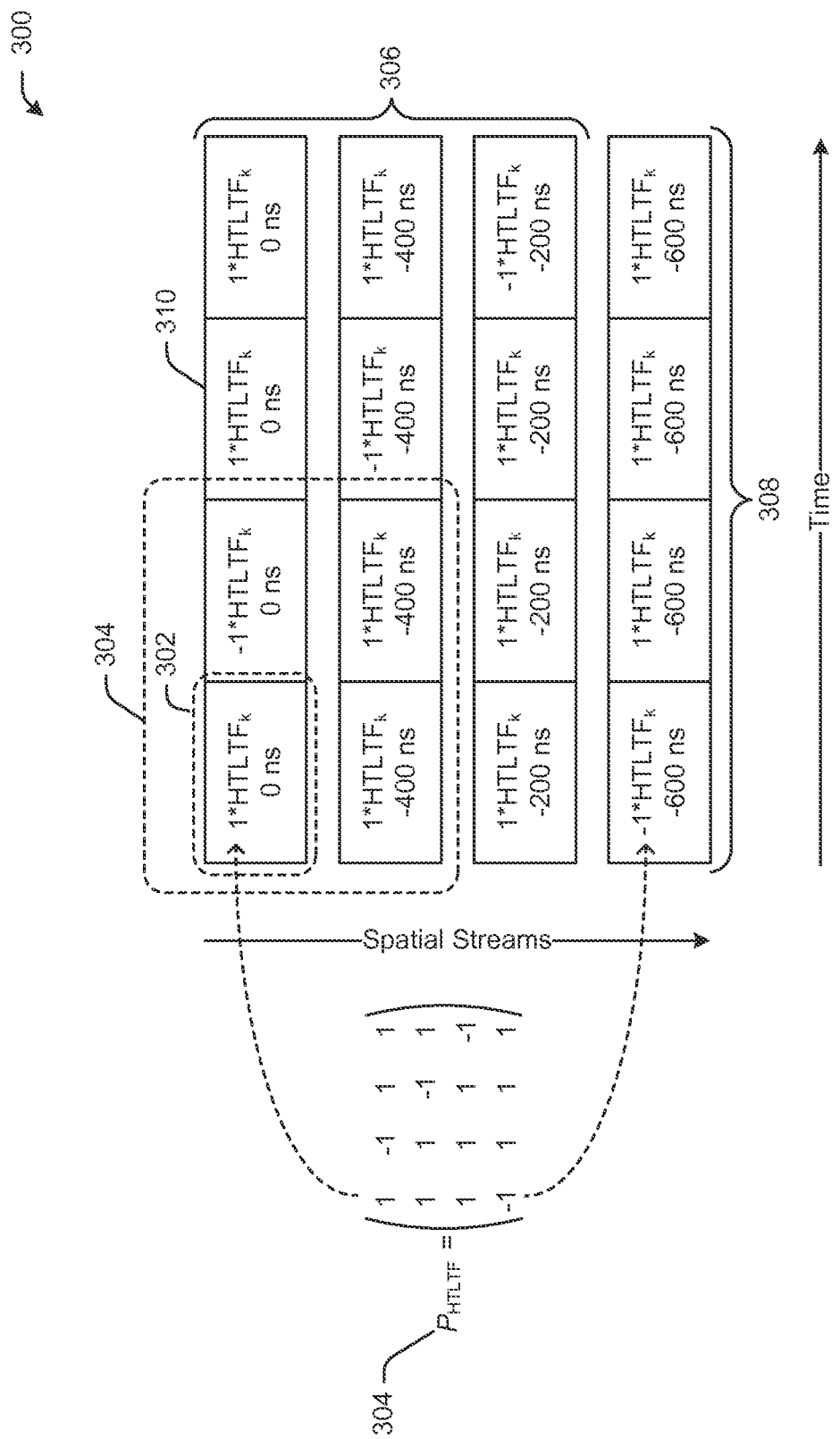
FIG. 3 illustrates example methods for encoding data streams using P-matrices in a wireless network, according to one or more example embodiments.

Referring now to FIG. 3, illustrating LTF structure 300 in 802.11n/ac standard wireless communication, the number of streams of a channel and/or a subband of a channel can be smaller than a number of LTF symbols required for the channel (and, if applicable, all of its included subbands). For example, if the number of streams is three, the number of LTF symbols can be four. In this case, the P-matrix for four streams is used and the first three rows are used to fill the P-matrix with LTF symbols, thereby forming a 3×4 code matrix, as shown in FIG. 3. The 1 and −1 coefficients in FIG. 3 form a 4×4 P-matrix 304, as illustrated below:

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

A first channel and/or a subband of a channel 302 may include just one stream, a second channel and/or a subband of a channel 304 may include two streams, a third channel and/or a subband of a channel 306 may include three streams, and a fourth channel and/or a subband of a channel 308 may include four streams, according to one or more example embodiments. Each of the streams 302-308 may include one or more LTF symbols 310, as illustrated in FIG. 3. In some embodiments, an access point may select and/or determine a number of LTF symbols for all subbands and/or subchannels. A P-matrix size is then determined based on the selected number of LTF symbols. Typically, the determined P-matrix size is the same as the selected number of LTF symbols (e.g., 2, 4, 8, and/or the like). For example, if 4 LTF symbols are required for transmission on each subband and/or subchannel, then the P-matrix size may be 4×4. In this manner, a P-matrix of a common size may be utilized for all subbands and/or subchannels. Furthermore, if a subband and/or subchannel has 'N' streams, then the first N rows of the P-matrix may be used.

In some embodiments, CFO estimation includes determining a time difference between clocks of a transmitter (e.g., an access point) and a receiver (e.g., a user device). For example, the receiver may obtain at least two observations (e.g., data points) about a channel response (e.g., a stream) of a channel and/or a subband of a channel at two different times. First, a stream (e.g., a channel response, a data signal, a transmission, a pulse, a ping, and/or the like) is generated and encoded with LTF symbols by the transmitter. The stream is then transmitted by the transmitter to the receiver. During reception of the stream (e.g., upon receiving a first LTF symbol at the beginning of an LTF symbol sequence), the receiver measures (e.g., determines) a first phase of the channel and/or subband on which the stream is transmitted and/or received. The measured (e.g., determined) first phase and a first time-stamp of the stream transmission can be recorded (e.g., stored). Next, a subsequent training signal (e.g., an additional LTF symbol of the transmitted stream) is received by the receiver. Upon receipt of the additional training signal of the stream at the receiver (e.g., upon receiving a second LTF symbol of an LTF symbol sequence), the receiver measures (e.g., determines) a second phase of the channel and/or subband on which the signal is transmitted and/or received. The measured (e.g., determined) second phase and a second time-stamp can be recorded (e.g., stored). The receiver may also measure (e.g., determine) a third phase of the channel and/or subband on which the signal is transmitted and/or received upon receipt of a last LTF symbol at the end of an LTF symbol sequence. The measured (e.g., determined) third phase and a third time-stamp can be recorded (e.g., stored).

Alternatively, a plurality of streams may be transmitted and/or received at different times. The receiver and/or the transmitter may be the device responsible for obtaining a first, second, third, and any subsequent phase measurement and/or time-stamp of a stream. In some embodiments, creating a larger difference in time between obtaining first and second observations (and any subsequent observations) about a channel response may assist in providing more accurate measurements of phase difference of a channel and/or a subband of a channel, thereby resulting in a more accurate calculated CFO. For example, for a given CFO, a larger time difference typically corresponds to a larger phase difference, which provides a more accurate CFO estimation. Additionally, more than two or three observations may be obtained, and multiple phase measurements may be taken and processed.

Typically, a channel frequency offset (CFO) is associated with a receiver and/or a transmitter device that has a clock difference between another device (e.g., a transmitter and/or a receiver). In some embodiments, a single subband and/or subchannel may facilitate communication between multiple receiving devices (in downlink multi-user MIMO, for example) and/or between multiple transmitting devices (in uplink multi-user MIMO, for example). A CFO is typically calculated between each pair of receiving devices and transmitting devices.

A CFO of the channel and/or subband of the channel can be estimated from the phase difference between the channel responses. So, the first phase and the second phase are processed by a computing device to calculate a phase difference between the first phase and the second phase. A channel frequency offset (CFO) is then calculated based on the calculated phase difference divided by a calculated time difference corresponding to a measured difference between two phase measurements. In this manner, CFO estimation for a channel and/or subband of a channel whose number of streams is less than the number of LTF symbols may be determined using the systems, methods, and apparatuses described herein.

In some embodiments of the present disclosure, the number of LTF symbols of each subband of an entire channel may be determined by a subband with the maximum number of streams. Let n1×n1, n2×n2, . . . nP×nP be the P-matrix sizes defined in the new standard equal to or greater than the maximum number of streams among all subbands. For example, in legacy 802.11ac, defined P-matrix sizes are 2×2, 4×4, 6×6, and 8×8. For maximum seven streams, a 8×8 P-matrix can be used, and eight LTF symbols are needed.

In certain embodiments of the present disclosure, a LTF symbol number of a particular channel and/or a subband of a channel may be indicated by an access point or a mobile station (e.g., a user device, a transmitter, a receiver, and/or the like). In this way, the same LTF symbol sequence may be assigned to a plurality of signals, thereby ensuring more reliable channel encoding, decoding, and/or CFO estimation. For example, a transmitter's clock may fluctuate due to a switch from receive mode to transmit mode (e.g., when switching between an uplink mode and a downlink mode). In some embodiments, a clock settling time of some devices may be the same or different than others. Therefore, additional LTF symbols may be used for accommodating devices with a slower settling to thereby increase accuracy of any CFO estimations.

For each channel and/or subband of a channel, the smallest code matrix C for encoding and/or decoding a LTF symbol sequence may be determined. For example, N may be a number of streams of a channel and/or a subband of a channel. If an N×N P-matrix is defined in a wireless standard, the code matrix C can be an N×N P-matrix. Otherwise, suppose M is the smallest number that has a defined M×M P-matrix in a wireless standard, where M≥N. N rows (or columns) of the M×M P-matrix can be used to form the code matrix C. For example, if an N×M P-matrix is used, the code matrix C can defined by the first N rows (or columns) of the defined M×M P-matrix. In another example, if the number of streams is two and the number of LTF symbols is four, then two defined 2×2 P-matrixes may be used for LTF symbols. In contrast, other designs may use the first two rows of the 4×4 P-matrix. If a channel and/or a subband of a channel has a number of streams equal to three but a 3×3 P-matrix is not defined in the standard, the first three rows of the smallest defined P-matrix that supports three streams may be used (e.g., 4×4 P-matrix). Using the smallest code matrix C, as described herein, allows the receiver to obtain channel observations (and therefore calculate estimates of CFOs) using the fewest or least number of LTF symbols as allowed by wireless standards.

For each channel and/or a subband of a channel, after a smallest N×M code matrix C is determined, where N≤M, both first M symbols (e.g., a first column of M) and the last M symbols (e.g., a last column of M) of the LTF symbol sequence are encoded by the code matrix C completely. As a result, a device (e.g., a receiver, a transmitter, a user device, a station 204, and/or the like) can obtain a set of channel estimates (e.g., phase measurements, CFO estimates, and/or the like) using first M LTF symbols when first receiving and/or decoding at a beginning of a LTF sequence and another set of channel estimates using last M LTF symbols at an end of the same LTF sequence. Note that M can be at least a number of LTF symbols required for obtaining a set of channel estimates by inverting the N×M code matrix C. Again, a larger time separation between obtaining two (or more) sets of channel observations results in a greater phase difference and, therefore, more accurate CFO estimations.

In 802.11n/ac, P-matrix may be applied to long training field (LTF) symbols across time domain, as illustrated in FIG. 3, for example. As illustrated in FIG. 3, two streams may be sent as shown in the top left corner, and two LTFs may be used, for example. For stream 1, two HT-LTF symbols may be sent over two OFDM symbols multiplied by (1, −1). For stream 2, two HT-LTF symbols may also be sent over the same two OFDM symbols superimposed on top of stream 1's and multiplied by (1, 1) as shown inside the dashed line box in FIG. 3, for example.

Since (1, −1) and (1, 1) are orthogonal sequences, each receiver may be able to estimate the channel responses of stream 1 and stream 2 by applying the corresponding orthogonal codes. For example, if a receiver wants to estimate the channel response of stream k for some subcarrier, then it can calculate a weighted sum of the received LTF symbols as $$\hat{h}(k) = p \sum_{i=1}^{N} c_i^*(k) s^* r_i, \quad (1)$$

where N is the number of OFDM or OFDMA symbols of the LTF, for example, the code length; $\hat{h}(k)$ is the estimated channel response for the subcarrier; p is the power normalization factor, for example 1/N; $r_i$ is the received signal on the subcarrier on the i-th OFDM or OFDMA symbol of the LTF; $c_i(k)$ is the i-th entry of the orthogonal code for stream k; $c_i^*(k)$ is the conjugate of $c_i(k)$; s* is the conjugate of the transmitted LTF signal the same for all streams on the subcarrier. It should be noted, however, that s may not vary over the OFDM symbols or with index i or with stream index k and it may only vary with frequency as in the legacy 802.11n/ac. The received signal $r_i$ may be a superimposition of all K streams' signals as $$r_i = \sum_{i=1}^{K} c_i(k) s h(k) + n_i, \quad (2)$$

where h(k) is the channel response of stream k for the subcarrier; $n_i$ is the noise plus co-channel interference; K is the number of streams. Substitution of (2) into (1) gives $$\hat{h}(k) = h(k) + p\|s\|^2 \sum_{k' \neq k} h(k') \sum_{i=1}^{N} c_i^*(k) c_i(k') + \varepsilon(k), \quad (3)$$

where $\varepsilon(k)$ is the noise plus co-channel interference; $p\|s\|^2 \sum_{k' \neq k} h(k') \sum_{i=1}^{N} c_i^*(k) c_i(k')$ is the aggregated crosstalk from the other K−1 streams. Since the code sequences of different streams are orthogonal i.e. $\sum_{i=1}^{N} c_i^*(k) c_i(k') = 0$ for $k' \neq k$, there may be zero crosstalk among the streams as $$\|s\|^2 \sum_{k' \neq k} h(k') \sum_{i=1}^{N} c_i^*(k) c_i(k') = \|s\|^2 \sum_{k' \neq k} h(k') \cdot 0 = 0. \quad (4)$$

It should be noted, however, that the zero crosstalk in (4) relies on zero CFO. Namely, the received LTF signal s remains the same across the N LTF symbols.

However, in reality, there are residual CFOs in the transmitter clocks of the different STAs in the uplink MU-MIMO. Therefore, the received LTF signal of the k-th stream, which is down converted by the AP's clock, varies across the LTF symbols as $$\tilde{s}(k) = e^{ji\Delta\omega_k T} s(k) \quad (5)$$

where T is the OFDM or OFDMA symbol duration; $\Delta\omega_k$ is the CFO of stream k; i is the LTF symbol index from 1 to N. The additional phase term $e^{ji\Delta\omega_k T}$ makes $\tilde{s}(k)$ vary from one LTF symbol to the other. As a result, the interference in (4) doesn't go to zero and it should be rewritten as $$\|s\|^2 \sum_{k' \neq k} h(k') \sum_{i=1}^{N} e^{ji\Delta\omega_k T} c_i^*(k) c_i(k') \quad (6)$$

The interference due to CFO degrades the channel estimate $\hat{h}(k)$ and thus the packet error rate performance. It is therefore desirable to reduce the interference of (6).

Figure 4:
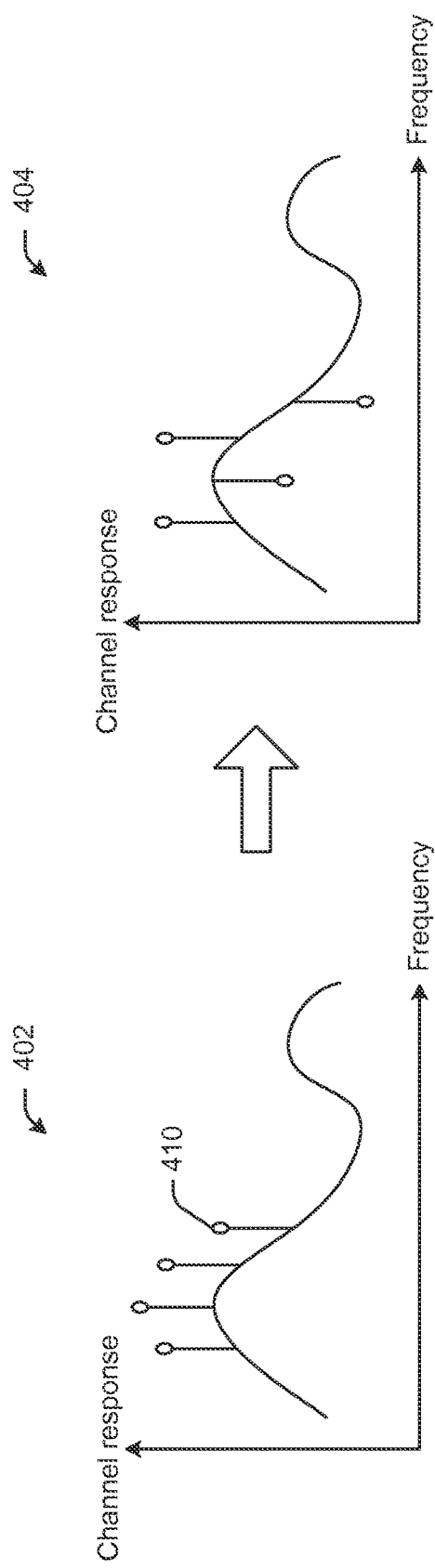
FIG. 4 illustrates interference characteristics of a channel frequency offset across a frequency domain in a wireless network, according to one or more example embodiments.

Turning now to FIG. 4, FIG. 4 illustrates interference characteristics of CFOs across frequency domain. The aggregated interference 402 from the other streams due to the CFOs varies slowly across frequency 410 as shown in the left portion of FIG. 4. The reason could be that the underlying channel responses of the streams vary slowly across frequency, for example, they may be correlated. This is true especially because beam forming is usually not applied in the uplink. Example systems, methods and devices disclosed may make use of the channel correlation to mitigate the CFO interference if the CFO can be converted into a high pass process 404 in frequency, for example.

Example systems, methods, and devices disclosed can introduce a perturbation in the interference such that the CFO interference is a high pass process 404 in contrast to the low pass process of the channel response as shown in the right portion of FIG. 4, for example. The AP can filter out the CFO interference by applying a smoothing filter across frequency.

Figure 5:
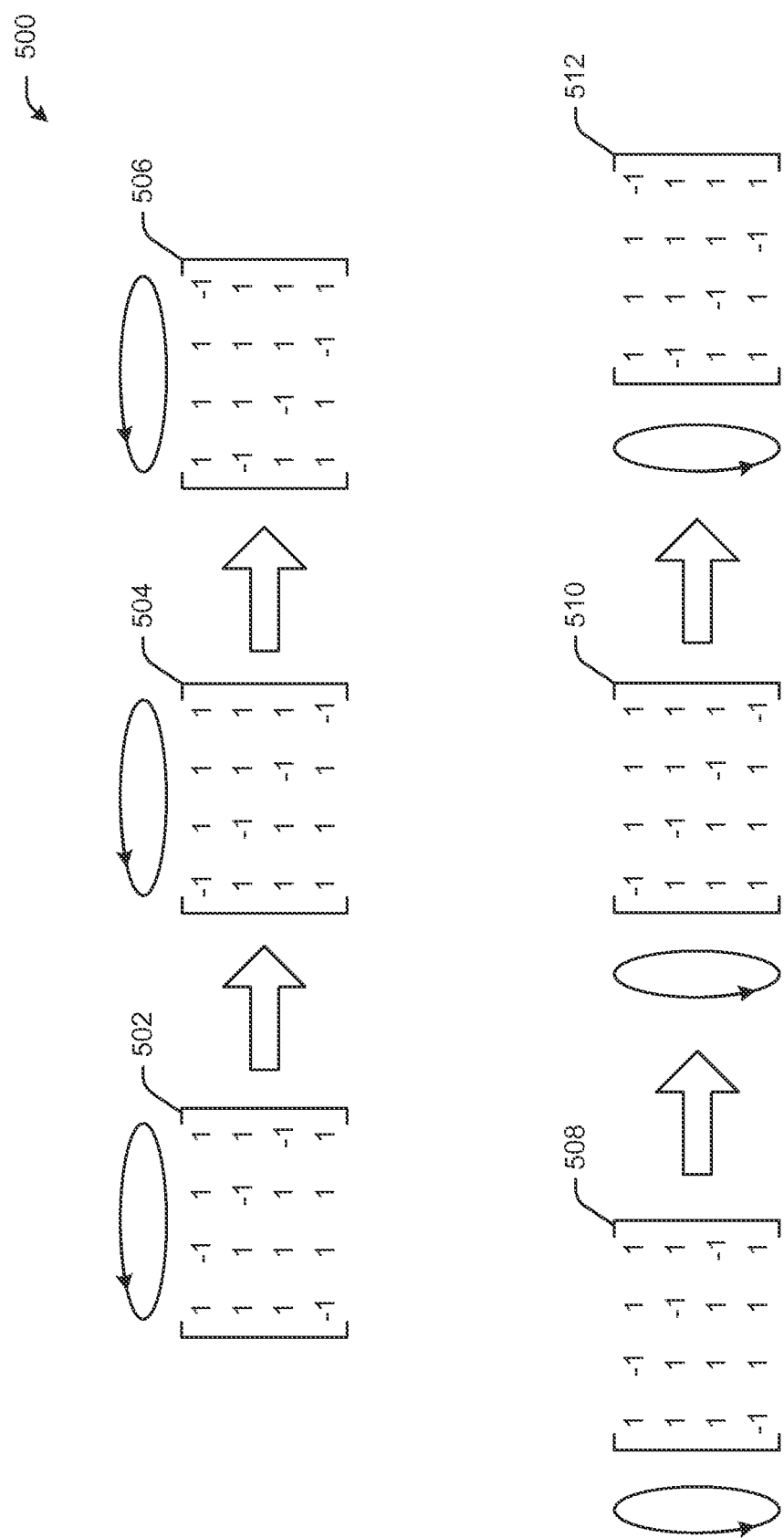
FIG. 5 illustrates horizontally and vertically cyclically shifted orthogonal codes for a plurality of subcarriers, according to one or more example embodiments.

According to one or more example embodiments, different streams or users may send out different channel training sequences across frequency. Because these training sequences may be different, the crosstalk among them varies across frequency. There are multiple ways to introduce such a perturbation in frequency. For example, different streams can use different LTF sequences across frequency. According to one example embodiment, multiple LTF sequences may be defined in the standard and the AP may assign the sequences to different users in uplink MU-MIMO. The LTF sequences may not be completely orthogonal with each other as a whole or as segment by segment because LTF sequence may be constrained by the requirement of low peak-to-average power ration (PAPR). According to another example embodiment, the orthogonal codes used by the streams can vary from one subcarrier to the other such that the interaction term between code entries i.e. $c_i^*(k) c_i(k')$ in (6) may vary across frequency. According to yet another embodiment 500, the orthogonal codes 502-512 used by the streams may be cyclically shifted from one subcarrier to the other such that the coefficient of $e^{ji\Delta\omega_k T}$ in (6) may vary across frequency, as illustrated in FIG. 5, for example.

Figure 6:
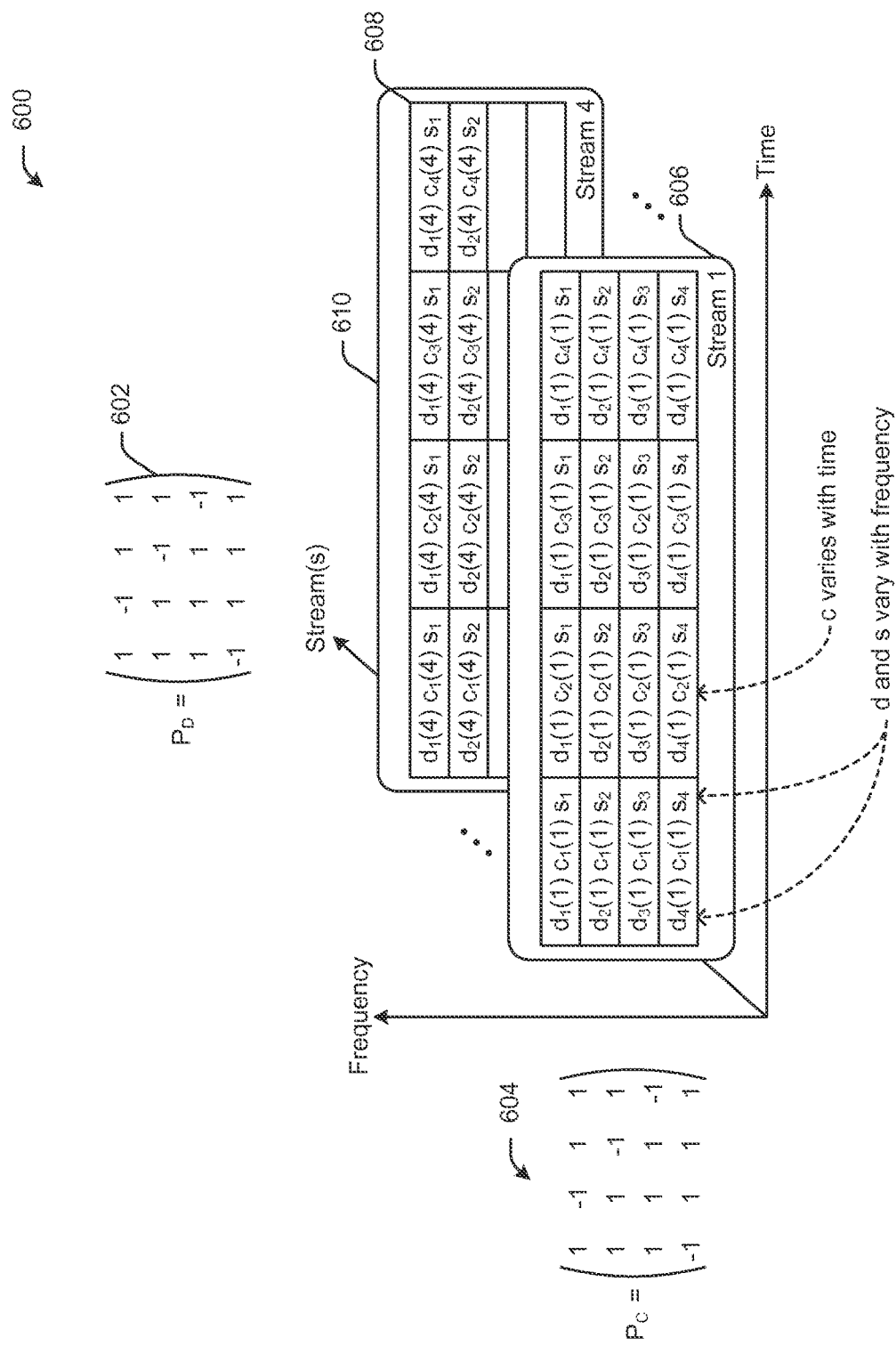
FIG. 6 illustrates example methods for encoding data streams using P-matrices across frequency and time domains, according to one or more example embodiments.

For maximizing the reuse of the legacy P-matrix, in addition to the P-matrix encoding 604 in time, example systems, methods, and devices may apply another P-matrix encoding 602 across frequency as shown in the example embodiment 600 illustrated in FIG. 6, for example. The transmitted signal on subcarrier m for stream 606-610 (or user) k and OFDMA symbol i can be written as $$x_{m,i} = d_{i_m}(k) c_i(k) s_m \quad (7)$$

where $d_{i_m}(k)$ is the entry at the $i_m$-th row and k-th column of (orthogonal) matrix $P_D$ 602 applied across frequency; $c_i(k)$ is the entry at the k-th row and i-th column of (orthogonal) matrix $P_C$ 604 applied across time; M is the number of rows 608 of matrix $P_D$ 602. The index $i_m$ steps through 1, 2, ... M as m increases 1, 2, 3, .... There are multiple functions to generate the index $i_m$ from m. For example, $i_m$=(m mod M)+1 and $i_m$=((m−1) mod M)+1 are two of them. If the indexes start from 0 instead of 1, then the index $i_m$ steps through 0, 1, 2, . . . , M−1 as m increases 0, 1, 2, 3, . . . . The generating function of index $i_m$ from m may then be $i_m$=m mod M. The legacy 802.11n/ac only have the term $c_i(k)$ for time encoding and the term $d_{i_m}(k)$ can be added for frequency encoding, as illustrated in FIG. 6, for example. For the ease of implementation and high reuse, the rows of the 8×8 P-matrix defined in 802.11ac may be used as the orthogonal codes applied across frequency. Namely, $P_D$ 602 in FIG. 6 is the transpose of the 8×8 P-matrix of 802.11ac or the 8×8 P-matrix itself and M equals 8.

Figure 7:
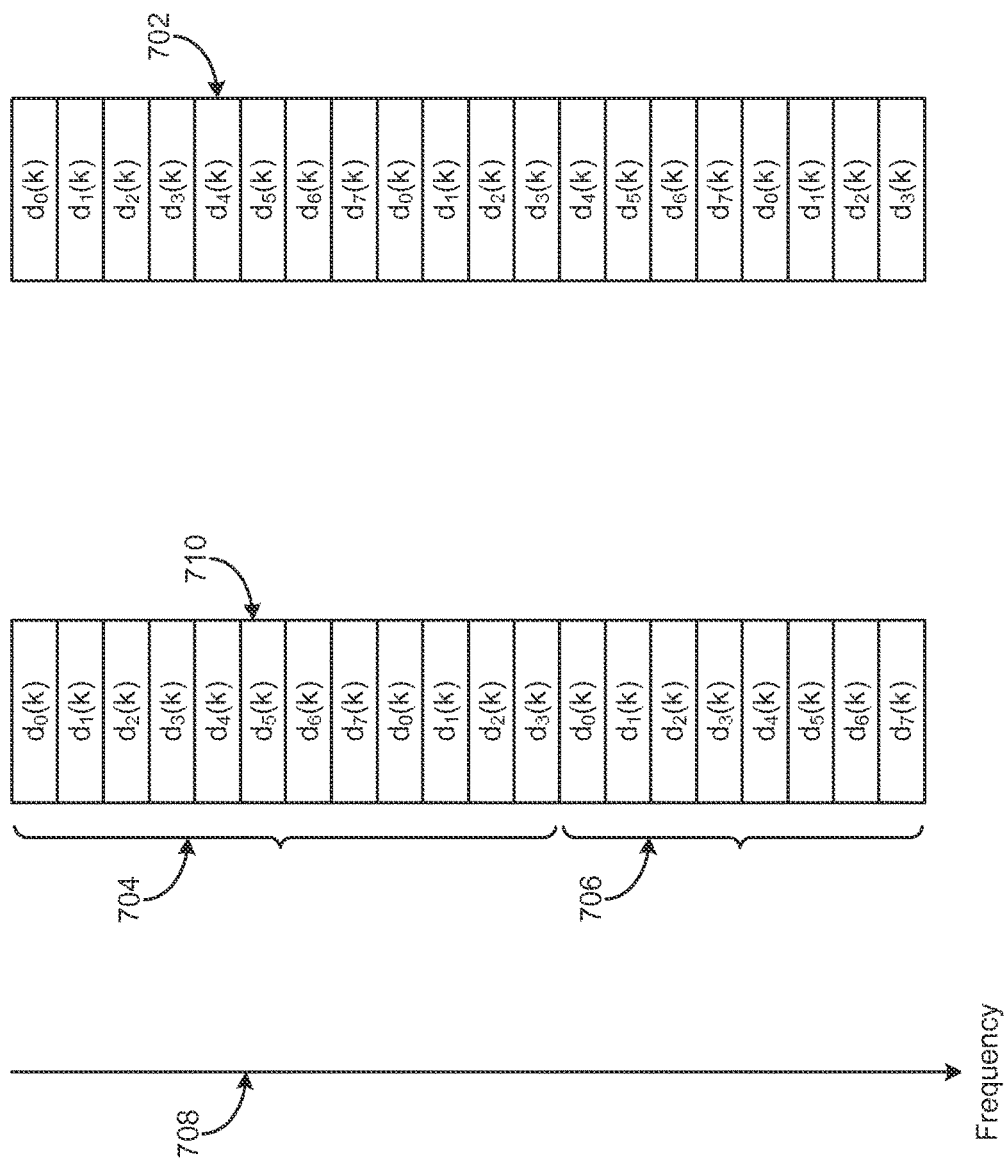
FIG. 7 illustrates example operations in a method for use in systems and devices, according to one or more example embodiments.

Turning now to FIG. 7, since 802.11ax may support OFDMA, the frequency band 708 may be divided into multiple sub-bands or sub-channels or resource units (RUs) 704, 706. Each device may be allocated one RU in frequency 708. The application of the frequency domain orthogonal code may be per resource unit (RU) based or simply for the whole band. For example, the code may start from the first entry for each RU in the first case 710 and the code entry may be cyclically contiguous over the whole band for the second case 702 as illustrated in FIG. 7, for example. Since different RUs 704, 706 may have different numbers of streams or users, different matrixes $P_D$ with different numbers of rows and columns may be used for different RUs. For example, the first resource unit 704 may have three streams and 4×4 orthogonal matrix may be used, the second resource unit 706 have 6 streams and 8×8 orthogonal matrix may be used. However, for simplicity, a single orthogonal matrix may be used for all numbers of streams or users. Since the 8×8 P-matrix of 802.11ac is a combination of 4×4 P-matrix and the 4×4 P-matrix is a combination of 2×2 P-matrix, the 8×8 P-matrix may be used as the single matrix for all number streams up to 8 streams.

At the AP, the receiver may apply three terms on the N received LTF symbols on subcarrier m for the channel estimation of stream k, which are $c_i^*(k)$ to remove the encoding across time, $d_{i_m}(k)$ to remove the encoding across frequency, and $s_m^*$ to remove the LFT sequence common to all streams or users. After the effects of codes and LFT sequence are removed, the received signals across time may be summed up together to remove the P-matrix encoding across time. After the P-matrix across time is removed, the received signals are passed to a smoothing filter e.g. low pass filter for removing the interference due to the CFOs as shown in equation (6), for example.

For simplicity, it can be assumed that the channel response remains the same across frequency over contiguous M subcarriers, e.g., 2 or 4 or 8. The AP receiver may apply three terms on the N received LTF symbols on subcarrier m and sums them up for estimating the channel of stream k. As a result, the interference from the other streams due to the CFOs on subcarrier m can be rewritten as $$\vartheta_m = \|S_m\|^2 \Sigma_{k' \neq k} d_{i_m}^*(k) d_{i_m}(k') h(k') \Sigma_{i=1}^N e^{ji\Delta\omega_k'T} c_i^*(k) c_i(k') \quad (8)$$

Assuming the LTF sequence has a constant modulus that is common in all existing LTF designs, $\|s_m\|^2$ is a constant q. Example systems, methods, and devices can apply a simple, low pass filter with M ones i.e. (1, 1, . . . , 1) to smooth the channel estimation over frequency. At the output of the smoothing filter, the interference due to the CFOs diminishes as $$\sum_{m=1}^M \vartheta_m = q \sum_{m=1}^M \sum_{k' \neq k} d_{i_m}^*(k) d_{i_m}(k') h(k') \sum_{i=1}^N e^{ji\Delta\omega_k'T} c_i^*(k) c_i(k') \quad (9)$$

$$= q \sum_{m=1}^M \sum_{k' \neq k} d_{i_m}^*(k) d_{i_m}(k') g(k')$$

$$= q \sum_{k' \neq k} g(k') \sum_{m=1}^M d_{i_m}^*(k) d_{i_m}(k')$$

$$= q \sum_{k' \neq k} g(k') \cdot 0$$

$$= 0$$

where $g(k')=h(k')\Sigma_{i=1}^N e^{ji\Delta\omega_k'T} c_i^*(k) c_i(k')$; and $\Sigma_{m=1}^M d_{i_m}^*(k) d_{i_m}(k')=0$ is due to the orthogonality of the codes defined in matrix $P_D$ and applied across frequency.

One or more example embodiments may relate to a method for mitigating interference in uplink multiuser MIMO. According to this illustrative method, an AP receiver may estimate arrival times of each stream or user's signal using LTF symbols. Since each stream or user sounds the channel using different sequences (e.g. across frequency) in the LFT symbols, the AP receiver can estimate the arrival times. The AP may use the transmitted sequences in time domain as the reference signals, respectively, to match against the received, superimposed signals in time domain. The peaks in the output of this matched filtering indicate the arrival times.

According to one example embodiment, for streams or users, the different arrival times causes different linear phase shifts in the frequency domain channel responses, respectively. Over a group of adjacent subcarriers in frequency domain, the channel response of each stream or user can be approximated as a constant complex number with a linear phase shift over frequency. Using the estimated linear shifts and the frequency domain transmitted codes of the streams or users, the AP can compute a zero-forcing filter or MMSE filter to mitigate the multiuser interferences among the streams or users and estimate the complex channel responses of each stream or user.

According to another example embodiment, for each LTF symbol, the AP receiver obtains the rough channel estimates of each stream or user for each subcarrier group. For the same subcarrier group, the channel responses over two different LTF symbols can be compared and the phase difference can be used to estimate the CFO. The number of subcarriers in the subcarrier group may be the length of the frequency domain code. The CFO of each stream can be computed by averaging the CFO estimates obtained from the subcarrier groups. The estimated CFOs are then used to compute the linear phase shifts over time over each stream's LTF symbol sequence. For each subcarrier, the linear phase shift is added to each stream or user's code sequence over time for decoding the P-matrix in time domain. For each subcarrier, using the phase compensated code sequences, the AP can compute a zero-forcing filter or MMSE filter to mitigate the multiuser interference due to CFO for estimating the fine channel responses of each streams or users.

The user specific information may include, for example, user ID (association ID (AID) or partial AID), modulation and coding scheme (MCS), spatial stream indexes, channel coding type (e.g. low density parity check (LDPC) or binary convolutional coding (BCC)), diversity scheme type (e.g.

space-time block coding (STBC) or cyclic shift diversity (CSD) or cyclic delay diversity (CDD)) for the user, for example.

Figure 8:
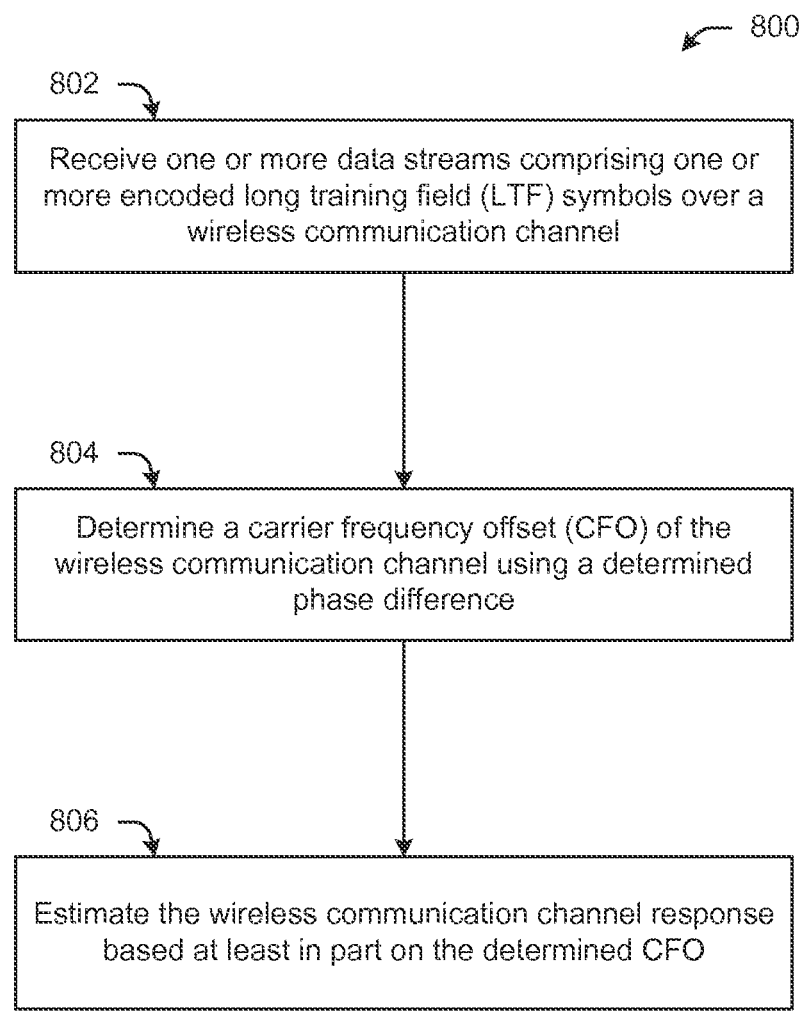
FIG. 8 illustrates example operations in a method for use in systems and devices, according to one or more example embodiments.
Figure 9:
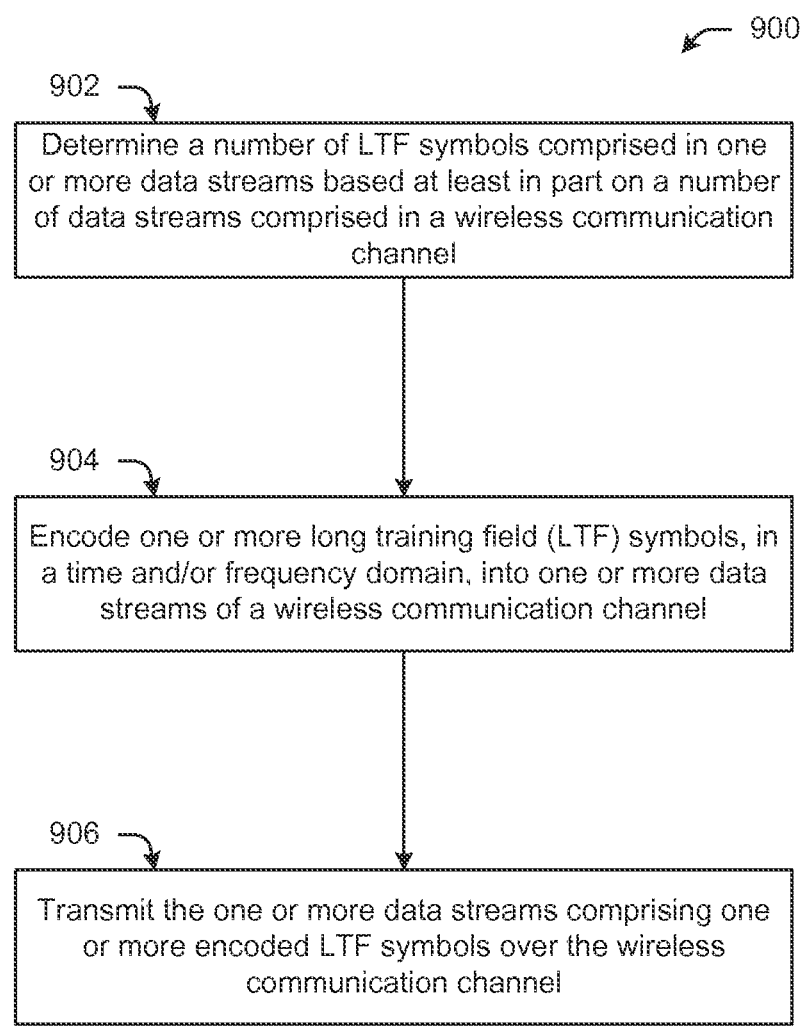
FIG. 9 illustrates example operations in a method for use in systems and devices, according to one or more example embodiments.

FIG. 8, for example, illustrates example operations that may be involved in a method 800 for mitigating interference in a Wi-Fi network, according to one or example embodiments. The method 800 may include at block 802 receiving, by a wireless communication device, one or more data streams including one or more encoded long training field (LTF) symbols over a wireless communication channel. At block 804, the method may include determining, by the wireless communication device, a first phase of the wireless communication channel upon receipt of a first LTF symbol, determining, by the wireless communication device, a second phase of the wireless communication channel upon receipt of a second LTF symbol, determining, by the wireless communication device, a phase difference between the first phase and the second phase. At block 806, the method may include determining, by the wireless communication device, a CFO of the wireless communication channel using the determined phase difference, and modifying, by the wireless communication device, the wireless communication channel estimate based at least in part on the determined CFO. The method may also include computing, by the wireless communication device, a zero-forcing filter or a minimum mean square error estimation (MMSE) filter for mitigating interference due to channel frequency offsets (CFOs) between two or more data streams, and determining a channel response of the one or more data streams. The first LTF symbol is a first LTF symbol in a sequence of LTF symbols included in the one or more data streams, and wherein the second LTF symbol is a later LTF symbol in the same sequence of LTF symbols included in the one or more data streams. The method may also include determining, by the wireless communication device, a number of LTF symbols included in the one or more data streams based on a number of data streams determined to be included in the wireless communication channel. The wireless communication channel includes one or more subbands, and wherein each subband is configured to transmit one or more data streams including the determined number of LTF symbols. The method may also include encoding, by the wireless communication device, the one or more data streams with the one or more LTF symbols using an orthogonal matrix, wherein the dimensions of the orthogonal matrix are defined by a number of data streams included in the one or more data streams and a number of LTF symbols included in the one or more LTF symbols, decoding, by the wireless communication device, the one or more data streams using the orthogonal matrix, and extracting, by the wireless communication device, the one or more LTF symbols from the one or more data streams. The method may also include determining, by the wireless communication device, the number of data streams included in the one or more data streams is less than the number of LTF symbols included in the one or more LTF symbols, and adding one or more additional LTF symbols to the one or more LTF symbols to be encoded in the one or more data streams so that a total number of LTF symbols encoded in the one or more data streams is equal to the determined number of data streams included in the one or more data streams, wherein the total number of LTF symbols includes a first decodable set of LTF symbols and a second decodable set of LTF symbols, wherein one or more additional LTF symbols are added to the first decodable set using an orthogonal matrix of a first size and one or more additional LTF symbols are added to the second decodable set using an orthogonal matrix of a second size different from the first size. FIG. 9, for example, illustrates example operations that may be involved in a method 900 for mitigating interference in a Wi-Fi network, according to one or example embodiments. The method may include determining a number of LTF symbols included in the one or more data streams based on a number of data streams determined to be included in the wireless communication channel at block 902. The method 900 may also include at block 904 encoding, by a device including at least one memory including computer-executable instructions stored thereon, and one or more processing elements to execute the computer-executable instructions, one or more LTF symbols in a time and/or frequency domain into one or more data streams of a wireless communication channel. At block 906 the method may include transmitting, by the device, the one or more data streams including one or more encoded LTF symbols over the wireless communication channel. The wireless communication channel includes one or more subbands, and wherein each subband is configured to transmit one or more data streams including the determined number of LTF symbols.

Figure 10:
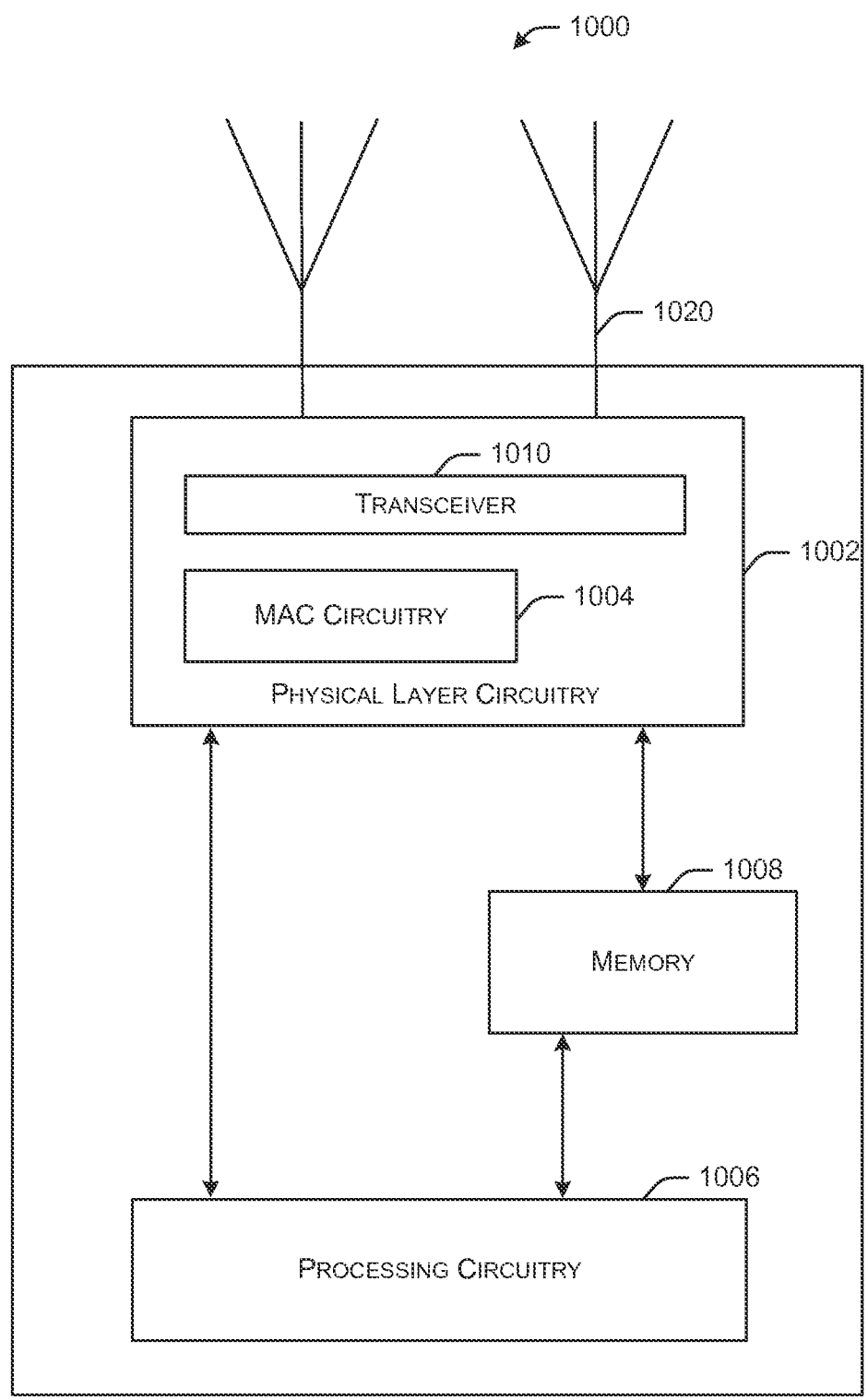
FIG. 10 illustrates a functional diagram of an example communication station or example access point, according to one or more example embodiments.

FIG. 10 shows a functional diagram of an exemplary communication station 1000 in accordance with some embodiments. In one embodiment, FIG. 10 illustrates a functional block diagram of a communication station that may be suitable for use as an AP 102 (FIG. 1) or communication station STA 104 (FIG. 1) in accordance with some embodiments. The communication station 1000 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 1000 may include physical layer circuitry 1002 having a transceiver 1010 for transmitting and receiving signals to and from other communication stations using one or more antennas 1020. The physical layer circuitry 1002 may also include medium access control (MAC) circuitry 1004 for controlling access to the wireless medium. The communication station 1000 may also include processing circuitry 1006 and memory 10010 arranged to perform the operations described herein. In some embodiments, the physical layer circuitry 1002 and the processing circuitry 1006 may be configured to perform operations detailed in FIGS. 2-9.

In accordance with some embodiments, the MAC circuitry 1004 may be arranged to contend for a wireless medium and configure frames or packets for communicating over the wireless medium and the physical layer circuitry 1002 may be arranged to transmit and receive signals. The physical layer circuitry 1002 may include circuitry for modulation/demodulation, upconversion/downconversion, filtering, amplification, etc. In some embodiments, the processing circuitry 1006 of the communication station 1000 may include one or more processors. In other embodiments, two or more antennas 1020 may be coupled to the physical layer circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device may, read-only memory (ROM), random-access memory (RAM), magnetic disk storage media, optical storage media, flash-memory devices and other storage devices and media.

In some embodiments, the communication station 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1000 may include one or more antennas 1020. The antennas 1020 may include one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1000 may include one or more of a keyboard, a display, a non-volatile memory port, multiple antennas, a graphics processor, an application processor, speakers, and other mobile device elements. The display may be an LCD screen including a touch screen.

Although the communication station 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware and software. Other embodiments may also be implemented as instructions stored on a computer-readable storage device, which may be read and executed by at least one processor to perform the operations described herein. The instructions may be in any suitable form, such as but not limited to source code, compiled code, interpreted code, executable code, static code, dynamic code, and the like. A computer-readable storage device or medium may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device memory.

Figure 11:
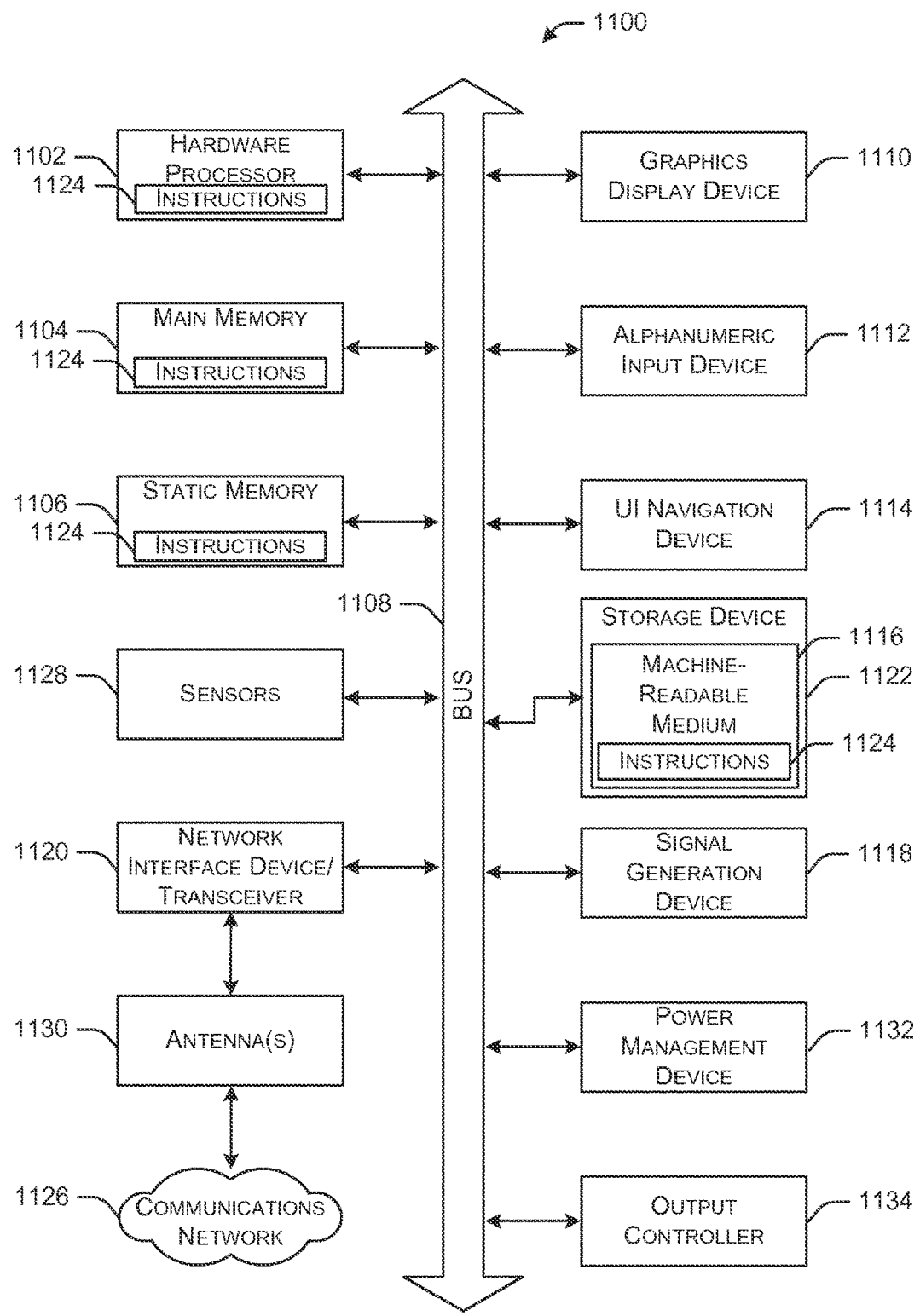
FIG. 11 shows a block diagram of an example of a machine upon which any of the techniques (e.g., methods) according to one or more example embodiments discussed herein may be performed.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112 and UI navigation device 1114 may be a touch screen display. The machine 1100 may additionally include a storage device (i.e., drive unit) 1116, a signal generation device 1118 (e.g., a speaker), a network interface device/transceiver 1120 coupled to antenna(s) 1130, and one or more sensors 1128, such as a global positioning system (GPS) sensor, compass, accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium includes a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible media to facilitate communication of such software.

In one embodiment, machine 1100 can include a set of one or more transmitters/receivers 1120, and components therein (amplifiers, filters, analog-to-digital (A/D) converters, etc.), functionally coupled to a multiplexer/demultiplexer (mux/demux) unit, a modulator/demodulator (mod/demod) unit (also referred to as a modem), and an encoder/decoder unit (also referred to as codec). Each of the transmitter(s)/receiver(s) can form respective transceiver(s) that can transmit and receive wireless signal (e.g., streams, electromagnetic radiation) via the one or more antennas.

Electronic components and associated circuitry, such as mux/demux unit, codec, and modem can permit or facilitate processing and manipulation, e.g., coding/decoding, deciphering, and/or modulation/demodulation, of signal(s) received by the computing device and signal(s) to be transmitted by the computing device. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including the one or more transmitters/receivers 1120, can exchange information (e.g., streams, LTF symbols, data, metadata, code instructions, signaling and related payload data, combinations thereof, or the like) through a bus, which can embody or can comprise at least one of a system bus, an address bus, a data bus, a message bus, a reference link or interface, a combination thereof, or the like. Each of the one or more receivers/transmitters can convert signal from analog to digital and vice versa. In addition or in the alternative, the receiver(s)/transmitter(s) can divide a single data stream into multiple parallel data streams, or perform the reciprocal operation. Such operations may be conducted as part of various multiplexing schemes. As illustrated, the mux/demux unit is functionally coupled to the one or more receivers/transmitters and can permit processing of signals in time and frequency domain. In one aspect, the mux/demux unit can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit can scramble and spread information (e.g., codes) according to most any code, such as Hadamard-Walsh codes, Baker codes, Kasami codes, polyphase codes, and the like. The modem can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) that can be included in the computing device (e.g., processor(s) included in the radio unit or other functional element(s) of the computing device) can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec can operate on information (e.g., data, metadata, signaling, or a combination thereof) in accordance with one or more coding/decoding schemes suitable for communication, at least in part, through the one or more transceivers formed from respective transmitter(s)/receiver(s). In one aspect, such coding/decoding schemes, or related procedure(s), can be retained as a group of one or more computer-accessible instructions (computer-readable instructions, computer-executable instructions, or a combination thereof) in one or more memory devices (referred to as memory). In a scenario in which wireless communication among the computing device and another computing device (e.g., an access point, a user device, a station and/or other types of user equipment) utilizes MU-MIMI, MIMO, MISO, SIMO, or SISO operation, the codec can implement at least one of space-time block coding (STBC) and associated decoding, or space-frequency block (SFBC) coding and associated decoding. In addition or in the alternative, the codec can extract information from data streams coded in accordance with spatial multiplexing scheme. In one aspect, to decode received information (e.g., data, metadata, signaling, or a combination thereof), the codec can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec can utilize, at least in part, mux/demux component and mod/demod component to operate in accordance with aspects described herein.

While there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

EXAMPLE EMBODIMENTS

One example embodiment is a computer-readable non-transitory storage medium that contains computer-executable instructions, which when executed by one or more processors result in performing operations including identifying one or more data streams including one or more encoded long training field (LTF) symbols over a wireless communication channel, determining a first phase of the wireless communication channel upon receipt of a first LTF symbol, determining a second phase of the wireless communication channel upon receipt of a second LTF symbol, determining a phase difference between the first phase and the second phase, determining a channel frequency offset (CFO) of the wireless communication channel using the phase difference, and determining the wireless communication channel estimate based at least in part on the determined CFO. The medium operations further comprise determining a zero-forcing filter or a minimum mean square error estimation (MMSE) filter for mitigating interference due to channel frequency offsets (CFOs) between two or more data streams, and determining a channel response of the one or more data streams. The first LTF symbol is a first LTF symbol in a sequence of LTF symbols included in the one or more data streams, and wherein the second LTF symbol is a last LTF symbol in a second sequence of LTF symbols included in the one or more data streams. The medium operations further comprise determining a number of LTF symbols included in the one or more data streams based on a number of data streams determined to be included in the wireless communication channel. The wireless communication channel includes one or more subbands, and wherein each subband is configured to transmit one or more data streams including the determined number of LTF symbols. The medium operations further comprise encoding the one or more data streams with the one or more LTF symbols using an orthogonal matrix, wherein the dimensions of the orthogonal matrix are defined by a number of data streams included in the one or more data streams and a number of LTF symbols included in the one or more LTF symbols, decode the one or more data streams using the orthogonal matrix, and extract the one or more LTF symbols from the one or more data streams. The medium operations further comprise determining the number of data streams included in the one or more data streams is less than the number of LTF symbols included in the one or more LTF symbols, and adding one or more additional LTF symbols to the one or more LTF symbols to be encoded in the one or more data streams so that a total number of LTF symbols encoded in the one or more data streams is equal to the determined number of data streams included in the one or more data streams, wherein the total number of LTF symbols includes a first decodable set of LTF symbols and a second decodable set of LTF symbols.

One example embodiment is a method for mitigating interference in a wireless network. The method may include receiving, by a wireless communication device, one or more data streams including one or more encoded long training field (LTF) symbols over a wireless communication channel, determining, by the wireless communication device, a first phase of the wireless communication channel upon receipt of a first LTF symbol, determining, by the wireless communication device, a second phase of the wireless communication channel upon receipt of a second LTF symbol, determining, by the wireless communication device, a phase difference between the first phase and the second phase, determining, by the wireless communication device, a CFO of the wireless communication channel using the determined phase difference, and modifying, by the wireless communication device, the wireless communication channel estimate based at least in part on the determined CFO. The method may also include computing, by the wireless communication device, a zero-forcing filter or a minimum mean square error estimation (MMSE) filter for mitigating interference due to channel frequency offsets (CFOs) between two or more data streams, and determining a channel response of the one or more data streams. The first LTF symbol is a first LTF symbol in a sequence of LTF symbols included in the one or more data streams, and wherein the second LTF symbol is a last LTF symbol in a second sequence of LTF symbols included in the one or more data streams. The method may also include determining, by the wireless communication device, a number of LTF symbols included in the one or more data streams based on a number of data streams determined to be included in the wireless communication channel. The wireless communication channel includes one or more subbands, and wherein each subband is configured to transmit one or more data streams including the determined number of LTF symbols. The method may also include encoding, by the wireless communication device, the one or more data streams with the one or more LTF symbols using an orthogonal matrix, wherein the dimensions of the orthogonal matrix are defined by a number of data streams included in the one or more data streams and a number of LTF symbols included in the one or more LTF symbols, decoding, by the wireless communication device, the one or more data streams using the orthogonal matrix, and extracting, by the wireless communication device, the one or more LTF symbols from the one or more data streams. The method may also include determining, by the wireless communication device, the number of data streams included in the one or more data streams is less than the number of LTF symbols included in the one or more LTF symbols, and adding one or more additional LTF symbols to the one or more LTF symbols to be encoded in the one or more data streams so that a total number of LTF symbols encoded in the one or more data streams is equal to the determined number of data streams included in the one or more data streams, wherein the total number of LTF symbols includes a first decodable set of LTF symbols and a second decodable set of LTF symbols, wherein one or more additional LTF symbols are added to the first decodable set using an orthogonal matrix of a first size and one or more additional LTF symbols are added to the second decodable set using an orthogonal matrix of a second size different from the first size.

One example embodiment is a device including at least one memory including computer-executable instructions stored thereon, and one or more processing elements to execute the computer-executable instructions to encode one or more long training field (LTF) symbols, in a time and/or frequency domain, into one or more data streams of a wireless communication channel, and transmit the one or more data streams including one or more encoded LTF symbols over the wireless communication channel. The device may be configured to determine a number of LTF symbols included in the one or more data streams based on a number of data streams determined to be included in the wireless communication channel. The wireless communication channel includes one or more subbands, and wherein each subband is configured to transmit one or more data streams including the determined number of LTF symbols.

A computer-readable non-transitory storage medium that contains computer-executable instructions, which when executed by one or more processors result in performing operations including encoding, by a device including at least one memory including computer-executable instructions stored thereon, and one or more processing elements to execute the computer-executable instructions, one or more LTF symbols in a time and/or frequency domain into one or more data streams of a wireless communication channel, and transmitting, by the device, the one or more data streams including one or more encoded LTF symbols over the wireless communication channel. The medium may also include determining a number of LTF symbols included in the one or more data streams based on a number of data streams determined to be included in the wireless communication channel. The wireless communication channel includes one or more subbands, and wherein each subband is configured to transmit one or more data streams including the determined number of LTF symbols.

What is claimed is:

1. A device for generating a high efficiency (HE) frame comprising a long training field (LTF) that includes one or more LTF symbols, wherein a first LTF symbol of the one or more LTF symbols and a second LTF symbol of the one or more LTF symbols are associated with two or more subcarriers, the HE frame to be sent to a receiver across one or more spatial streams, the device comprising memory and processing circuitry configured to:
    determine a p-matrix comprising one or more orthogonal code entries, wherein a first orthogonal code entry of the one or more orthogonal code entries corresponds to a spatial stream of the one or more spatial streams;
    generate the first LTF symbol by applying a first subcarrier of the two or more subcarriers to the first orthogonal code entry, wherein the first LTF symbol is associated with a first frequency;
    generate the second LTF symbol by applying a second subcarrier of the two or more subcarriers to the first orthogonal code entry, wherein the second LTF symbol is associated with a second frequency, wherein the first frequency is different from the second frequency;
    generate the LTF of the HE frame, wherein the LTF comprises the first LTF symbol and the second LTF symbol; and
    cause to send the HE frame across the one or more spatial streams.

2. The device of claim 1, wherein to generate the first LTF symbol further comprises to apply a third subcarrier of the two or more subcarriers to a second orthogonal code entry of the one or more orthogonal code entries.

3. The device of claim 1, wherein a row of orthogonal code entries of the one or more orthogonal code entries corresponds to the spatial stream.

4. The device of claim 1, wherein a resource unit is associated with the first subcarrier.

5. The device of claim 1, wherein the p-matrix comprises eight rows and eight columns.

6. The device of claim 1, wherein to cause to send the HE frame comprises to cause to send the HE frame in an uplink transmission.

7. The device of claim 1, further comprising a transceiver configured to transmit and receive wireless signals.

8. The device of claim 7, further comprising one or more antennas coupled to the transceiver.

9. A non-transitory computer-readable medium storing computer-executable instructions which when executed by one or more processors result in performing operations comprising:
    receiving, by a first device for performing multiple input, multiple output (MIMO) channel estimation using a long training field (LTF) of a high efficiency (HE) frame received over one or more spatial streams, wherein the LTF comprises one or more LTF symbols, and wherein a first LTF symbol of the one or more LTF symbols and a second LTF symbol of the one or more LTF symbols are associated with two or more subcarriers;
    identifying the first LTF symbol by applying a first orthogonal code entry of a p-matrix comprising one or more orthogonal code entries to a first subcarrier of the two or more subcarriers associated with the one or more LTF symbols, wherein the first orthogonal code entry corresponds to a spatial stream of the one or more spatial streams, wherein the first LTF symbol is associated with a first frequency;

identifying the second LTF symbol by applying the first orthogonal code entry to a second subcarrier of the two or more subcarriers, wherein the second LTF symbol is associated with a second frequency, wherein the first frequency is different from the second frequency; and enabling the MIMO channel estimation of a MIMO channel between a set of receive chains on the first device and a set of outputs on a second device that sent the HE frame.

10. The non-transitory computer-readable medium of claim 9, wherein identifying the first LTF symbol further comprises applying a third subcarrier of the two or more subcarriers to a second orthogonal code entry of the one or more orthogonal code entries.

11. The non-transitory computer-readable medium of claim 9, wherein the operations further comprise identifying a channel frequency offset correction using one or more pilots associated with the first LTF symbol.

12. The non-transitory computer-readable medium of claim 9, wherein a resource unit is associated with the first subcarrier.

13. The non-transitory computer-readable medium of claim 9, wherein the one or more LTF symbols are included in a preamble of the HE frame.

14. The non-transitory computer-readable medium of claim 9, wherein the HE frame is received in an uplink transmission.

15. A method for generating, at a first device, a high efficiency (HE) frame comprising a long training field (LTF) that includes one or more LTF symbols, wherein a first LTF symbol of the one or more LTF symbols and a second LTF symbol of the one or more LTF symbols are associated with two or more subcarriers, the HE frame to be sent to a receiver across one or more spatial streams, the method comprising:

determining, by one or more processors of the first device, a p-matrix comprising one or more orthogonal code entries, wherein a first orthogonal code entry of the one or more orthogonal code entries corresponds to a spatial stream of the one or more spatial streams;

generating, by the one or more processors, the first LTF symbol by applying a first subcarrier of the two or more subcarriers to the first orthogonal code entry, wherein the first LTF symbol is associated with a first frequency;

generating, by the one or more processors, the second LTF symbol by applying a second subcarrier of the two or more subcarriers to the first orthogonal code entry, wherein the second LTF symbol is associated with a second frequency, wherein the first frequency is different from the second frequency;

generating, by the one or more processors, the LTF of the HE frame, wherein the LTF comprises the first LTF symbol and the second LTF symbol; and causing to send, by the one or more processors, the HE frame across the one or more spatial streams.

16. The method of claim 15, wherein generating the first LTF symbol further comprises applying a third subcarrier of the two or more subcarriers to a second orthogonal code entry of the one or more orthogonal code entries.

17. The method of claim 15, wherein a row of orthogonal code entries of the one or more orthogonal code entries corresponds to the spatial stream.

18. The method of claim 15, wherein a resource unit is associated with the first subcarrier.

19. The method of claim 15, wherein the p-matrix comprises eight rows and eight columns.

20. The method of claim 15, wherein causing to send the HE frame comprises causing to send the HE frame in an uplink transmission.

* * * * *